United States Patent [19]
Lincoln

[11] Patent Number: 5,884,570
[45] Date of Patent: Mar. 23, 1999

[54] APPARATUS AND METHOD FOR PROPAGATING GRASS AND OTHER LIVING PLANTS USING A SOD SLURRY

[76] Inventor: James A. Lincoln, 6435 Sunnyland La., Dallas, Tex. 75214

[21] Appl. No.: 704,905

[22] Filed: Aug. 30, 1996

Related U.S. Application Data

[60] Provisional application No. 60/003,108 Sep. 1, 1995.
[51] Int. Cl.⁶ .................................................. A01C 1/00
[52] U.S. Cl. ........................ 111/130; 111/100; 47/DIG. 9
[58] Field of Search ..................... 47/1.01, 57.6, 47/58, DIG. 9; 111/118, 127, 130, 100; 405/128, 269, 267, 283

[56] References Cited

U.S. PATENT DOCUMENTS

| | | | |
|---|---|---|---|
| 2,596,898 | 5/1952 | Hoppes | 222/142 |
| 2,728,401 | 12/1955 | Brannon | 170/156 |
| 2,737,314 | 3/1956 | Anderson | 221/135 |
| 2,789,399 | 4/1957 | Finn | 47/58 |
| 2,878,617 | 3/1959 | Finn | 47/1 |
| 2,991,051 | 7/1961 | Jones | 259/107 |
| 3,091,436 | 5/1963 | Finn | 259/95 |
| 3,241,173 | 3/1966 | Finn | 15/328 |
| 3,292,307 | 12/1966 | Finn | 47/58 |
| 3,401,890 | 9/1968 | Middlesworth | 239/670 |
| 3,406,760 | 10/1968 | Weir | 170/160.5 |
| 3,407,432 | 10/1968 | Finn | 15/352 |
| 3,586,245 | 6/1971 | Carlyon, Jr. | 239/662 |
| 3,717,285 | 2/1973 | Hatton | 222/136 |
| 3,726,441 | 4/1973 | Keyes et al. | 222/178 |
| 3,899,984 | 8/1975 | Keyes et al. | 110/18 R |
| 3,915,591 | 10/1975 | Aiki et al. | 416/132 |
| 3,920,184 | 11/1975 | Waldrum | 239/10 |
| 3,942,457 | 3/1976 | Keyes et al. | 114/61 |
| 3,968,933 | 7/1976 | Waldrum | 239/171 |
| 4,140,349 | 2/1979 | Behnken | 302/14 |
| 4,177,012 | 12/1979 | Charles | 416/132 |
| 4,187,055 | 2/1980 | Barnstead | 416/132 |
| 4,219,966 | 9/1980 | McCalister | 47/9 |
| 4,465,017 | 8/1984 | Simmons | 118/418 |
| 4,547,126 | 10/1985 | Jackson | 416/132 |
| 4,627,791 | 12/1986 | Marshall | 416/132 |
| 4,631,860 | 12/1986 | Broughton | 47/58 |
| 4,660,775 | 4/1987 | Ostrom et al. | 239/727 |
| 4,705,217 | 11/1987 | Hartley et al. | 239/142 |
| 4,723,710 | 2/1988 | Lucore, II | 239/124 |
| 4,729,514 | 3/1988 | Ostrom et al. | 239/727 |
| 4,750,438 | 6/1988 | Johnson | 111/1 |
| 4,926,768 | 5/1990 | Magda | 111/11 |
| 4,949,656 | 8/1990 | Lyle et al. | 111/174 |
| 5,012,974 | 5/1991 | Johnson | 239/1 |
| 5,050,995 | 9/1991 | Lucore, II | 366/136 |
| 5,267,696 | 12/1993 | Balmer | 239/662 |
| 5,361,711 | 11/1994 | Beyerl | 111/127 |

*Primary Examiner*—Thomas B. Will
*Assistant Examiner*—Robert Pezzuto
*Attorney, Agent, or Firm*—Baker & Botts, L.L.P.

[57] ABSTRACT

A method of rapidly propagating grass and other living plant materials using a sod slurry. The method includes mechanically mixing sod having the desired species of grass or other living plant material with water, fertilizer and a slicking agent to produce a sod slurry which may be sprayed onto a prepared section of land using a conventional pump, hose and nozzle or other types of commercially available spraying equipment. Alternatively, the sod slurry may be poured from a bucket or other suitable container onto the prepared area of land. Mulch and other materials may be added to the mixing tank as appropriate for the selected species of grass or other living plant material. The soil portion of the sod cooperates with other portions of the slurry such as fertilizer or mulch to encourage rapid growth of the selected species of grass or other living plant material on the prepared area of land.

20 Claims, 1 Drawing Sheet

APPARATUS AND METHOD FOR PROPAGATING GRASS AND OTHER LIVING PLANTS USING A SOD SLURRY

This application is a continuation of Provisional Application No. 60/003,108, filed Sep. 1, 1995.

TECHNICAL FIELD OF THE INVENTION

This invention relates to propagating grass and other plants using vegetative planting techniques and, more particularly, to planting selected species of grass or other living plants using a water based slurry formed in part from sod having the selected species of grass or other living plant material.

BACKGROUND OF THE INVENTION

Many grasses and other plants have been successfully propagated using vegetative planting techniques associated with applying live plant material to an appropriately prepared area of land or top soil. Examples of such vegetative techniques include planting grass on prepared land by laying solid slabs of sod on the land, spotting with sod plugs or spraying a water based slurry with grass sprigs (stolons, rhizomes or both) over the prepared land. This last vegetative planting technique may sometimes be referred as hydro-sprigging.

Hydro-sprigging processes typically include harvesting grass sprigs from existing turf with a special digging device or vertical cutting machine. The resulting grass sprigs are generally, but not always completely, free of any soil. The sprigs are typically mixed in a tank with water along with mulch material, fertilizer, wetting agent and/or slicking agent as desired. The equipment associated with hydro-sprigging typically includes a mixing tank having an agitator system such as a paddle with multiple blades attached to a motor for stirring the water based slurry and a pump capable of pumping the resulting slurry of water, grass sprigs, mulch and other material. The mulch material and slicking agent help to prevent clogging of the slurry within the pump and associated tubing and hoses. The mulch material also protects the sprigs once the water based slurry has been sprayed on a prepared area of land.

Examples of equipment and methods associated with propagating grasses and other plants using a sprayable slurry are described in the following U.S. Pat. Nos.:
3,091,436 Method for Producing a Sprayable Fibre Mulch
3,717,285 Apparatus for Spraying a Slurry
4,219,966 Method of Rapid Grass Growth
4,705,217 Material Mixing and Spraying Apparatus
5,012,974 Method and Apparatus for Applying Pregerminated Plantlets
5,361,711 Apparatus for Seeding, Mulching, and Fertilizing Soil The above listed patents are incorporated by reference for all purposes within this application.

SUMMARY OF THE INVENTION

In accordance with teachings of the present invention, disadvantages and problems associated with previous equipment and techniques for vegetative propagation of grasses and other living plants have been substantially reduced or eliminated. The present invention includes placing whole pieces of sod having the desired grass and/or other living plant material in a mixing tank and creating a liquid slurry. The whole pieces of sod may vary from conventional slabs which are normally used to completely cover an area of appropriately prepared land to smaller plugs which are normally discretely placed with respect to each other. Also, the contents of pots or containers of various sizes having soil with the desired grass or other living plant may be placed in the mixing tank.

Technical advantages of the present invention include using whole pieces of sod having the desired grass or living plant material which substantially increases the availability of plant material which can be propagated using vegetative techniques. Sod is readily available in many local markets and can be successfully shipped for long distances at reasonable costs. The present invention reduces costs associated with vegetative propagation since sod in various sizes with many different species of grass and other living plant material is available from many producers at relatively low costs. Sprigs of grass are generally much less readily available due to the capital investment required for specialized equipment to harvest, stow and ship such grass sprigs. Grass sprigs associated with hydro-sprigging techniques are highly perishable and must be carefully protected. Sod is much more durable and easier to maintain over a period of several days. Living plant material in containers or pots may be satisfactorily maintained for extended periods of time.

One aspect of the present invention includes placing whole pieces of sod having living plant material into a tank and mixing the sod with water, mulch material, fertilizer, and an appropriate slicking agent. The soil component of the sod becomes a significant portion of the resulting slurry. The slurry containing living plant material may then be placed on appropriately prepared area of land by various techniques such as spraying or pouring.

Further technical advantages of the present invention include using whole pieces of sod having the selected grass or other living plant material and soil with appropriate organic and inorganic nutrients to encourage growth of the selected grass or other living plant material. Forming a slurry that includes such soil in accordance with teachings of the present invention, increases successful propagation of the selected grass or other living plant material as compared to other systems and methods of propagating grasses and other living plant materials.

Another aspect of the present invention includes cost advantages which result from spraying a sod slurry over a prepared section of land as compared with placing slabs of sod over the same prepared area of land. Vegetatively propagating grass or other living plant material using slabs of sod is highly labor and intensive, and typically requires complete coverage of the area of land with the selected slabs of sod. Depending upon the selected type of grass or other living plant material, a sod slurry prepared in accordance with teachings of the present invention can be successfully used to vegetatively propagate an area five to fifty times the area of the sod used to form the slurry. A sod slurry in accordance with teachings of the present invention, will typically form an effective network of living plant material and roots to significantly reduce erosion of the prepared area of land within one or two weeks. Planting plugs such as four inch plugs spaced twelve inches apart, often subjects a prepared area of land to erosion for a considerable period of time until the network of living plant material and roots has spread to fill in blank areas between the respective plugs.

Still further technical advantages of the present invention include preparing a sod slurry in accordance with the teachings of the present invention when the selected species of grass or other living plant material is in a dormant state.

An appropriately prepared area of land may then be covered with the sod slurry having dormant living plant material. When the surrounding environmental conditions are appropriate, such as temperature, amount of sunlight and moisture, the selected species of grass or other living plant material will then begin to grow and propagate on the prepared area of land. For some applications, forming the sod slurry when the selected species of grass or other living plant material is in its dormant state, may offer more protection from possible damage during the mixing and/or spraying steps. Also, forming a sod slurry when the selected species of grass or other living plant material is in its dormant state will further reduce costs by substantially extending the annual time period during which a prepared area of ground may be covered with a sod slurry in accordance with the teachings of the present invention.

BRIEF DESCRIPTION OF THE DRAWINGS

For a more complete understanding of the present invention, and the advantages thereof, reference is now made to the following written description taken in conjunction with the accompanying drawings, in which like reference numbers indicate like features, and wherein.

DETAILED DESCRIPTION OF EXEMPLARY EMBODIMENTS

Figure 1:
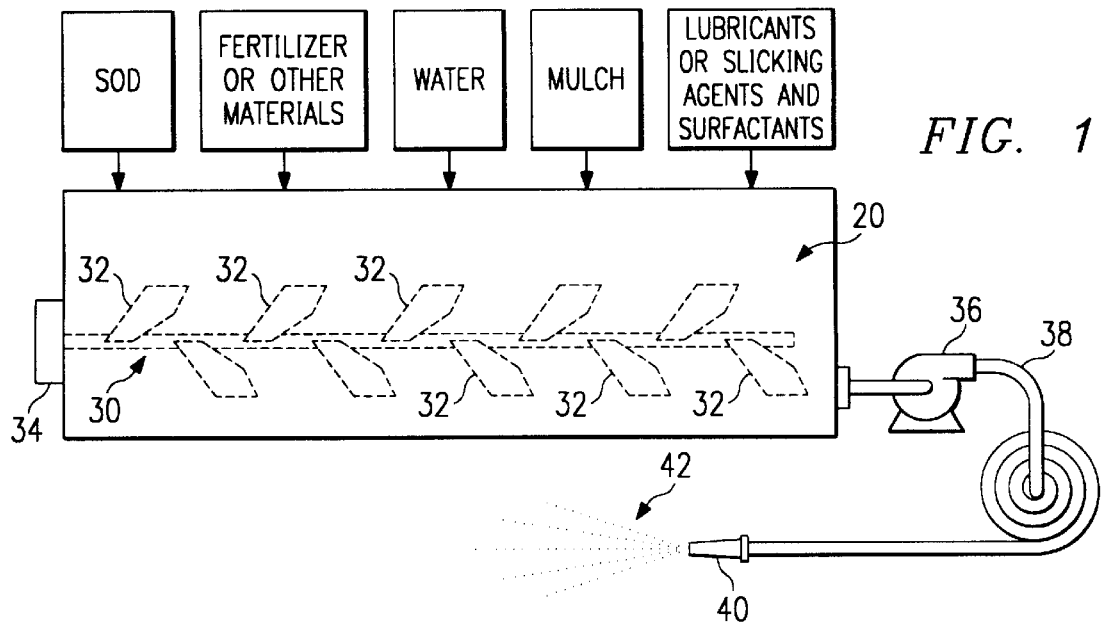
FIG. 1 is a schematic drawing showing a mixing tank and various materials including sod and water that may be added to the mixing tank in accordance with teachings of the present invention.
Figure 2:
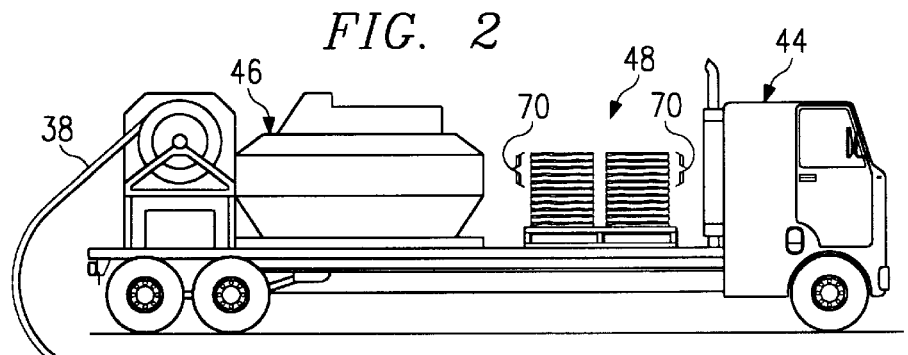
FIG. 2 is a schematic drawing in elevation with portions broken away showing hydro-mulching equipment satisfactory for use in forming a sod slurry in accordance with teachings of the present invention.
Figure 3:
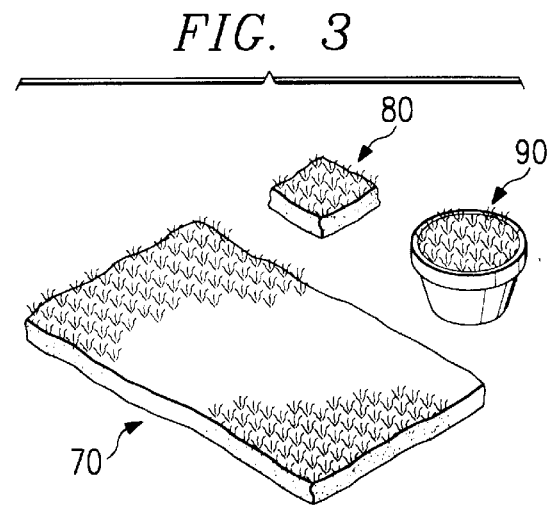
FIG. 3 is a schematic drawing showing various types of sod having grasses or other living plant materials satisfactory for use in forming a sod slurry in accordance with teachings of the present invention.

The preferred embodiment of the present invention and its advantages are best understood by referring to FIGS. 1 through 3 of the drawings, like numerals being used for like and corresponding parts of the various drawings.

For purposes of the present application, the term "sod" shall mean a section of grass covered or plant covered top soil held together by matted roots. Examples of sod satisfactory for use with the present invention include slab 70, plug 80 and the contents of container 90 as shown in FIG. 3. Top soil may also sometimes be referred to as surface soil.

The term "turf" may also be used to refer to surface soil containing a dense growth of grass and associated matted roots. With respect to grass type plants, "sod" and "turf" have the same meaning.

The terms "top soil" and "surface soil" mean freely divided rock derived material containing an admixture of organic matter along with inorganic components capable of supporting vegetation such as grasses and other types of plants. One of the benefits of the present invention includes using the same soil with appropriate organic and inorganic nutrients that initially supported the selected grass or other plant to form a portion of the sod slurry used to further propagate the selected grass or living plant on an appropriately prepared area of land.

For purposes of the present application, the term "stolon" shall mean a stem growing along the surface of the ground and taking root at the nodes or apex to form new plants. For purposes of the present application, the phrase "stolonipherous grasses or other plants" shall mean those grasses or other plants bearing or forming stolons which result in vegetative propagation and/or spreading of the respective grass or other plant.

For purposes of the present application, the term "rhizome" shall mean a stem growing under the surface of the ground that sends out roots from its lower portion and leaves or shoots from its upper portion. For purposes of the present application, the phrase "rhizomenous grasses or other plants" shall mean those grasses or other plants bearing or forming rhizomes which result in vegetative propagation and/or spreading of the respective grass or other plant.

Whole pieces of sod such as slab 70, plug 80 or the contents of containers 90 with the selected variety of grass or other living plant material may be placed in mixing tank 20 as shown in FIG. 1. One of the benefits of the present invention includes varying the amount of top soil associated with slab 70, plug 80 or container 90. For some applications, slab 70, plug 80 or container 90 may include a relatively thin, light layer of top soil held together by matted roots. For other applications, slab 70, plug 80 or container 90 may contain a relatively thick, heavy layer of top soil as appropriate for the selected variety of grass or other living plant material and the length of time until sod slurry 42 is formed.

Water and other selected materials such as fertilizer, mulch, lubricants, slicking agents and/or surfactants may also be placed in mixing tank 20. Examples of mulch satisfactory for use with the present invention include CONWED® mulch available from Conwed Corporation in Hickory, N.C. and SILVA-FIBER® mulch available from Weyerhaeuser Company in Tacoma, Wash. Examples of slicking agents satisfactory for use with the present invention include organic guar gum and soap. For one application, one to two pounds of guar gum is mixed with each 100 gallons of water.

Mixing tank 20 preferably includes agitator system 30 having paddles 32 with multiple blades and motor 34 to rotate paddles 32. Agitator system 30 will mechanically mix the water, sod, slicking agent and other materials contained within mixing tank 20. As part of the mixing process, sod such as slab 70, plug 80 or the contents of container 90, are torn apart to form a water based slurry having a large number of individual pieces of living plant material and soil. For many varieties of grass, when the sod is torn apart, the resulting pieces of living plant material may resemble grass sprigs produced by conventional grass sprig harvesting techniques. Other plant material may or may not be torn apart or altered during the mixing process. An appropriately sized pump 36 is preferably connected with tank 20 to discharge the resulting sod slurry 42 through hose 38 and nozzle 40. A wide variety of commercially available spraying equipment may be satisfactorily used to cover a prepared area of land with sod slurry 42. The present invention is not limited to use with hose 38 in nozzle 40.

For some applications, the selected variety of living grass or other plant material may be grown in pot 90 or other suitable container holding an appropriate amount of soil. The contents of pot or container 90 including the living plant material and soil may be placed in mixing tank 20 along with water and other selected materials as previously described. The contents of the pot 90 are mechanically mixed within mixing tank 20 to form the desired sod slurry.

A BOWIE HYDRO-MULCHER™ machine, equipped with an appropriate mixing tank, pump, piping, hoses and nozzle has been satisfactorily used to propagate grass in accordance with the teachings of the present invention. Other types of hydro-seeding and/or hydro-mulching equipment may be used with the present invention.

For some applications, mixing tank 20 and agitator system 30 may be placed on a truck, trailer or other type of vehicle for use in vegetatively propagating a prepared of soil. For example, FIG. 2 shows truck 44 carrying conventional hydromulching equipment satisfactory for use with the present invention. Such equipment may be obtained from Bowie Industries of Bowie, Tex., or James Lincoln Corp. of Garland, Tex.

Pallet 48 with two stacks of slabs 70 is also shown in FIG. 2. Truck 44 may be driven to a location adjacent to prepared area of land 50. An appropriate number of slabs 70 may then be placed into the mixing tank of hydromulching equipment 60 to form a sufficient quantity of sod slurry 42 to cover the prepared area of land 50. Slabs 70 may, if desired, be torn into smaller pieces prior to placing the sod into the mixing tank of hydromulching equipment 60.

Sod slurry 54 containing pieces of living plant material and soil may then be pumped or otherwise removed from mixing tank 20 and sprayed or placed onto area of land 50 which has been appropriately prepared for propagation of the selected variety of grass or plant. For some grasses and plants, sod slurry 42 may be pumped from mixing tank 20 and sprayed without damaging the living plant material disposed within sod slurry 42. For other varieties of grass and plants, sod slurry 42 may be removed from the mixing tank 20 using a bucket or other suitable container and poured onto the prepared area of land 50 to prevent damaging the living plant material.

Sod in the form of slab 70, plug 80 or pot 90 is relatively durable and may be satisfactorily maintained over a period of several days, or even longer for pot 90. Therefore, sod having the desired variety of grass or other living plant, may be successfully shipped from a relatively remote location and stored for a period of time prior to vegetatively propagating the selected grass or other plant using the techniques of the present invention. Thus, whole sod satisfactory for use with the present invention may be obtained from a large number of sod producers in many different locations. Also, pots 90 of various sizes are available from many producers with numerous varieties of grass and other plants growing in soil contained with the pots.

Numerous species of grass and other plants may be successfully propagated from slab 70, plug 80 or pot 90 using the present invention. Examples of the different species of grass which may be vegetatively propagated using the present invention include *Cynoden Dactylon* (Bermudagrass), *Buchloe Dactyloides* (Buffalograss) and *Zoysia Japonica* (Zoysiagrass). The specific grass varieties include 419 Tifway Bermudagrass, Prairie Buffalograss and Belair Zoysiagrass. Examples of other species of grass which may be vegetatively propagated using the present invention include *Poa Pratensis* (Kentucky bluegrass), *Agrostis Palustris* (Creeping bentgrass). Examples of other plants which may be successfully propagated using the present invention include Hedera such as English ivy, *Spartina Alternislora* (smooth cordgrass), *Spartina Patens* (marshhay cordgrass), English Ivey and *Paspalum Vaginium* (seashore Paspalum). Additional varieties and species of grasses and other plants may be propagated using vegetative techniques of the present invention.

Harvested sprigs of grass and other plants are generally less readily available since such sprigs are highly perishable and more difficult to successfully ship. As a result of using whole sod such as slab 70, plug 80 or pot 90 in accordance with the teachings of the present invention, the available supply of material for vegetatively propagating living grasses and other plants has been substantially increased. The present invention may also increase the available supply of material and may increase the annual time period available by allowing vegetative propagation of some grass species or other living plants during their respective dormant state. Also, for some species of grass or other living plants a sod slurry may be transported for considerable distance without damaging the living plant material, particularly when the living plant material is in its dormant state.

An example of one mixture for planting a warm season, stoloniferous grass, includes one hundred gallons of water, three to five square yards of slabs 70, twenty five pounds of hydro-mulch material, five to fifteen pounds of fertilizer, and an appropriate guar gum slicking agent. Other ingredients, including wetting agents, water holding gels, and plant stimulating hormones may also be added to the mixture. These ingredients may be combined and mixed to form sod slurry 42 in mixing tank 20, and then applied by pumping sod slurry 42 through hose 38, or otherwise transferring sod slurry 42 from tank 20 onto an appropriately prepared area of land.

Typically, the area planted may range from five to fifty times the quantity of square yards of sod used to form the sod slurry. For other applications, the area planted using the teachings of the present invention may be varied substantially depending upon the selected variety of grass or other living plant. Depending upon the selected grass species or other living plant species, slab 70 may typically vary in size from approximately sixteen inches by twenty-four inches (16"×24") to eighteen inches by twenty four inches (18"× 24"). Again, depending upon the selected grass species or other living plant species, plug 80 may typically vary in size from approximately three inches by three inches (3"×3") to four inches by four inches (4"×4").

Immediate irrigation following planting and frequent irrigation for a few weeks thereafter substantially enhances plant survival. Applying an additional covering of a protective material, such as mulch or a mulch blanket, will reduce plant death due to heat or desiccation and further enhances plant survival.

Although the present invention and its advantages have been described in detail, it should be understood that various changes, substitutions, and alterations can be made therein without departing from the spirit and scope of the invention as defined in the following claims.

What is claimed is:

1. A method of vegetatively propagating a selected species of living plants comprising the steps of:

placing whole pieces of sod with the selected plant species in a mixing tank;

adding water to the mixing tank;

mixing the water with the sod to form a sod slurry with pieces of the living plant material and soil from the sod; and pumping the sod slurry from the tank through a sprayer to cover an appropriately prepared area of land.

2. The method of claim 1 further comprising the step of growing the selected plant species in soil having an optimum mixture of organic and inorganic nutrient to support growth of the selected plant species both before the sod is placed in the mixing tank and after the sod slurry has been sprayed on the prepared area of land.

3. The method of claim 1 further comprising the step of adding a slicking agent to the mixing tank to minimize damage to the living plant material when pumping the sod slurry from the tank.

4. The method of claim 1 wherein the step of placing whole pieces of sod in the mixing tank further comprises, the step of placing a plurality of slabs of sod containing the selected plant species in the mixing tank.

5. The method of claim 1 wherein the step of placing whole pieces of sod in the mixing tank further comprises the step of placing a plurality of plugs of sod containing the selected plant species in the mixing tank.

6. The method of claim 1 wherein the step of placing whole pieces of sod in the mixing tank further comprises placing the contents of a plurality of containers having soil and the selected plant species growing therein.

7. The method of claim 1 further comprising the step of covering an appropriately prepared area of land which is approximately five times the total area of the whole pieces of sod placed in the mixing tank.

8. The method of claim 1 further comprising the step of covering an appropriately prepared area of land which is approximately fifty times the total area of the whole pieces of sod placed in the mixing tank.

9. The method of claim 1 further comprising the step of placing whole pieces of sod selected from the group consisting of *Cynoden Dactylon* (Bermudagrass), *Buchloe Dactyloides* (Buffalograss), *Zoysia Japonica* (Zoysiagrass), 419 Tifway Bermudagrass, Prairie Buffalograss, Belair Zoysiagrass, *Poa Pratensis* (Kentucky bluegrass), *Agrostis Palustris* (Creeping bentgrass), Hedera, *Spartina Alternislora* (smooth cordgrass), *Spartina Patens* (marshhay cordgrass), English Ivey and *Paspalum Vaginium* (seashore Paspalum) in the mixing tank.

10. The method of claim 1 further comprising the step of placing whole pieces of sod in the mixing tank when the selected plant species is in its dormant state.

11. A method of vegetatively propagating a selected species of living grass comprising the steps of:

placing whole pieces of sod containing the selected grass species in a mixing tank;

adding water to the mixing tank;

mixing the water with the sod to form a slurry containing pieces of the selected grass species and soil from the sod; and removing the slurry from the tank and covering an appropriately prepared area of land with the slurry.

12. The method of claim 11 further comprising the step of growing the selected grass species in soil having an optimum mixture of organic and inorganic nutrients to support growth of the selected grass species both before the sod is placed in the mixing tank and after the slurry has been placed on the prepared area of land.

13. The method of claim 11 wherein the whole pieces of sod are selected from the group consisting of slabs, plugs or pots with the selected grass species and soil.

14. The method of claim 11 further comprising the steps of:

adding a slicking agent to the mixing tank; and pumping the slurry from the mixing tank through a hose and a nozzle to cover the prepared area of land with the slurry.

15. The method of claim 11 further comprising:

the step of placing the whole pieces of sod into a hydromulching machine having the mixing tank formed as a part thereof; and pumping the slurry from the mixing tank through a sprayer to cover the prepared area of land.

16. The method of claim 11 wherein the step of removing the slurry from the tank further comprises filling a bucket with the slurry and pouring the slurry onto the appropriately prepared area of land.

17. A slurry for vegetatively propagating a selected species of plant comprising:

a mixture of water and sod containing the species of plant;

the sod including soil and living plant material of the species of plant; and soil from the sod forming a part of the slurry separate from the living plant material, the soil comprising an optimum mixture of organic and inorganic nutrients to support the growth of the species of plant.

18. The slurry of claim 17 wherein the species of plant is selected from the group consisting of *Cynoden Dactylon* (Bermudagrass), *Buchloe Dactyloides* (Buffalograss), *Zoysia Japonica* (Zoysiagrass), 419 Tifway Bermudagrass, Prairie Buffalograss, Belair Zoysiagrass, *Poa Pratensis* (Kentucky bluegrass), *Agrostis Palustris* (Creeping bentgrass), Hedera, *Spartina Alternislora* (smooth cordgrass), *Spartina Patens* (marshhay cordgrass), English Ivey and *Paspalum Vaginium* (seashore Paspalum) in the mixing tank.

19. The slurry of claim 17 further comprising a slicking agent to minimize damage to the living plant material when pumping of the slurry through a hose.

20. The slurry of claim 17 further comprising the species of plant in its dormant state.

\* \* \* \* \*